(12) United States Patent
Parikh

(10) Patent No.: US 7,689,617 B2
(45) Date of Patent: Mar. 30, 2010

(54) DYNAMIC LEARNING FOR NAVIGATION SYSTEMS

(76) Inventor: Prashant Parikh, 254 E. 68th St., Apartment 21D, New York, NY (US) 10021

( * ) Notice: Subject to any disclaimer, the term of this patent is extended or adjusted under 35 U.S.C. 154(b) by 305 days.

(21) Appl. No.: 11/361,726

(22) Filed: Feb. 24, 2006

(65) Prior Publication Data
US 2006/0200442 A1 Sep. 7, 2006

Related U.S. Application Data

(60) Provisional application No. 60/656,631, filed on Feb. 25, 2005.

(51) Int. Cl.
*G06F 7/00* (2006.01)
*G06F 17/30* (2006.01)
(52) U.S. Cl. .............. 707/737; 707/749; 707/756
(58) Field of Classification Search ............ None
See application file for complete search history.

(56) References Cited

U.S. PATENT DOCUMENTS

2005/0055344 A1* 3/2005 Liu et al. ............... 707/3

OTHER PUBLICATIONS

Belew, "Adaptive Information Retrieval: Using a connectionist representation to retrieve and learn about documents", Proceedings of the 12th annual international ACM SIGIR conference on Research and development in information retrieval, pp. 11-20, ACM, 1989.*

* cited by examiner

*Primary Examiner*—Neveen Abel Jalil
*Assistant Examiner*—Michael J Hicks
(74) *Attorney, Agent, or Firm*—Weitzman Law Offices, LLC

(57) ABSTRACT

A method performed in a system involves, at a node within the system, receiving an input from a user, determining that the input contains an unknown word, presenting at least one response to the user, and based upon at least one additional input from the user, learning one or more associations for the unknown word.

20 Claims, 7 Drawing Sheets

ND THE INVENTION

DYNAMIC LEARNING FOR NAVIGATION SYSTEMS

CROSS-REFERENCE TO RELATED APPLICATIONS

This application claims benefit of priority, pursuant to 35 U.S.C. §119(e), of U.S. Provisional Application Ser. No. 60/656,631 filed Feb. 25, 2005, incorporated herein by reference in its entirety.

FIELD OF THE INVENTION

The present invention relates to information processing and, more particularly, learning in the context of search and navigation systems.

NOTICE OF COPYRIGHT RIGHTS

A portion of the disclosure of this patent document contains material that is protected by copyright. The copyright owner has no objection to the facsimile reproduction of the patent document or the patent disclosure as it appears in the Patent and Trademark Office file or records, but otherwise reserves all copyright rights whatsoever.

COMPUTER PROGRAM LISTING APPENDIX

This application includes, and incorporates herein by reference as if fully set forth herein, program code submitted herewith (and in the parent application) on two (2) CD-R compact disks (an original and a duplicate) that are direct copies of those created on Feb. 25, 2005 submitted with the parent application and respectively labeled "Copy 1" and "Copy 2" and respectively containing identical ASCII text files of 105 kilobytes named "Computer Program Listing Appendix 4428-4003.txt".

BACKGROUND OF THE INVENTION

In modern life, there are a number of situations involving search and navigation for relevant data. All of these share two characteristics: a repository of structured (e.g. relational databases), semi-structured (e.g. a website), or unstructured (a text document like the Declaration of Independence or this patent application) data; and a device through which the user conducts the search or navigation (e.g. a personal computer or multifunctional handheld unit like a PDA or cellular phone). The data may be stored on the device itself (e.g. on a computer's hard disk or in a cellular phone's memory) or may reside remotely on one or more servers to which the device is connected in one of several possible ways during the search or navigation.

Familiar examples of such systems are traditional search engines for finding information on the World Wide Web, or in specialized databases (e.g. EDGAR, the U.S. Patent Office's PATFT and AppFT databases containing patent documents, or MEDLINE, the database of medical information), or the many search systems available for information residing on personal computers; navigation systems also abound (e.g. so-called IVRs or Interactive Voice Response Systems which are ubiquitous today and involve tracing a path down a menu tree one step at a time or more advanced "dialogue systems" that involve more sophisticated speech recognition).

All these systems share a limitation in common—that the search or navigation is based entirely on keywords. If a user is searching for a "vintage car" then a document containing "antique automobile" will be missed. This is true not just of traditional search systems but is also true of navigation systems like IVRs and speech recognition systems which require the choosing of specific options (e.g. "press 3 for domestic reservations" in an airline reservation system) or the utterance of specific keywords (e.g. "domestic reservations") to advance the user's position in the navigation.

U.S. Published Patent Application No. 20040098381 entitled "Navigation in a Hierarchical Structured Transaction Processing System" to Parikh et al. disclosed a way of navigating through a set of interconnected nodes, having a distinguished "start node" or "root node" where the nodes are connected hierarchically or as a directed graph and each node is, contains or is associated with a "document" or a "verbal description," through generation and use of associations among words from the documents or verbal descriptions. However, that method has some limitations in that it may not be possible to generate all useful associations in advance and the disclosed techniques for learning meanings for words did not handle certain cases.

DETAILED DESCRIPTION

Figure 1:
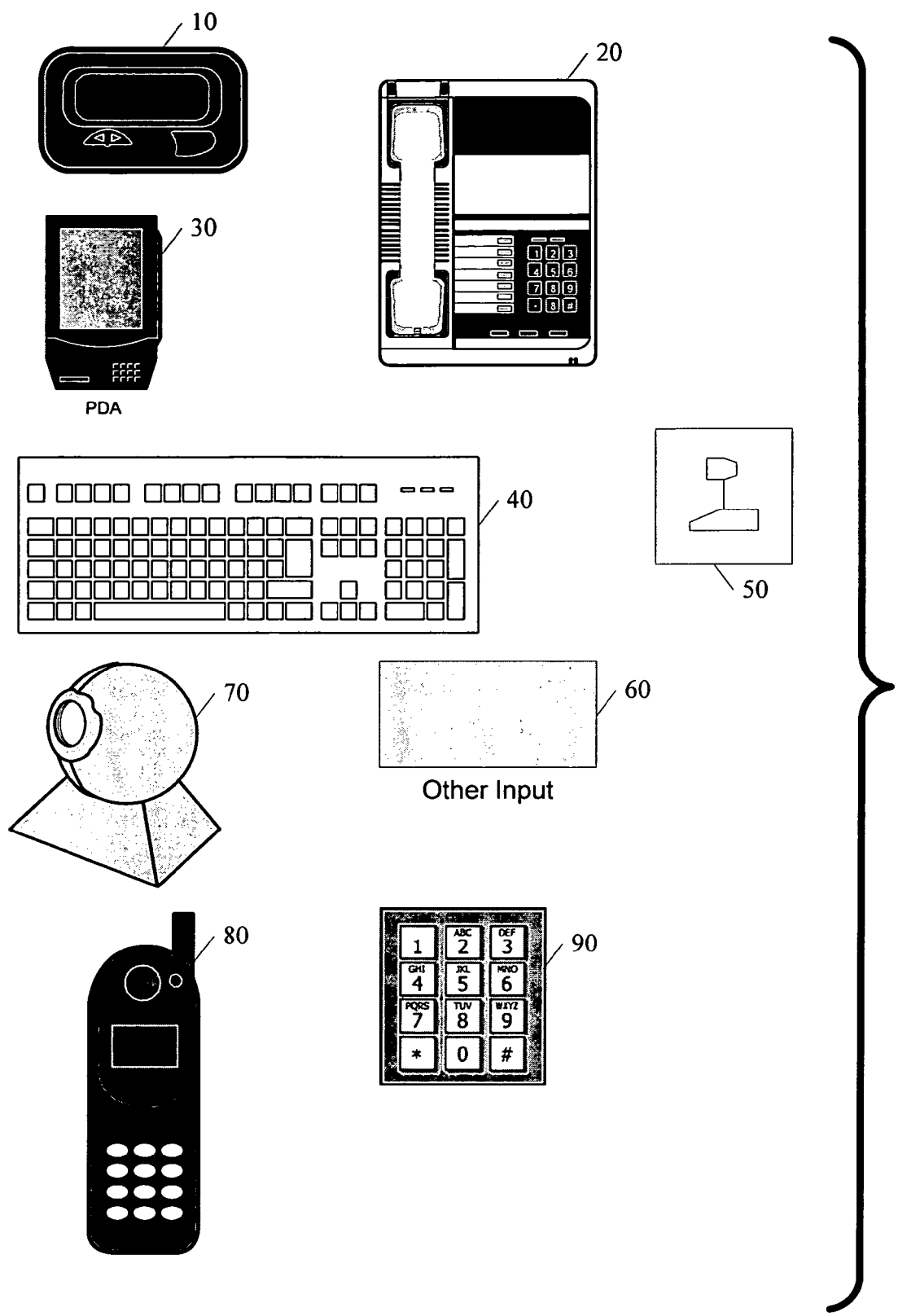
FIG. 1 is a simplified representation of the various devices that can be used in connection with the present invention.

The present claimed invention improves upon the invention of Parikh et al. and can be implemented in the same contexts. In addition, for ease of understanding, the terminology of that application is generally maintained unless noted to the contrary and the text of U.S. Published Patent Application No. 20040098381 entitled "Navigation in a Hierarchical Structured Transaction Processing System" to Parikh et al. is incorporated herein by reference as if fully set forth herein.

In overview, the present approach builds upon that approach of generating associations between general words (in particular, words that are not keywords and are not synonyms given in a "thesaurus" generated in advance, hereinafter called "learned words" or "unknown words" depending on the context) and keywords and using these associations to direct the user to relevant nodes of the graph that contain information or instructions the user may be seeking. However, in the present case, when a user types an unknown word (i.e. a word that is neither a keyword or an existing synonym, either generated in advance or through the learning method itself), the user is asked in one of several different ways to trace down a path from the root node of the graph (or from the level of the root node's children) to a node that contains information relevant to the user. Then one of two actions are taken: i) either the unknown word is associated with that node itself (or equivalently, with the document attached to that node), or, ii) more powerfully, the unknown word is associated with all the keywords in the document. Thereafter, as before, the next time a user inputs the same hitherto unknown (but now learned) word to the system, the system looks up the associated node(s) or keywords and returns either the nodes associated with the learned word (if the first action above is employed), or the nodes/documents that contain the associated keywords (if the second action above is taken) to the user. As before, the process of learning continues so a learned word can acquire additional associated nodes or keywords as users continue to use the system.

The first method of learning is applicable in situations where the documents contain very little or no information identifiable by the system and thus keywords are not available for association with the unknown word. A typical example would be an archive of images or photographs with no comments or meaningful names. In such a circumstance the unknown word is associated with the document itself. Thus, this approach allows the system to learn even in the absence of keywords. In addition, this approach also optionally can provide for the user to train the system to select certain documents with specific words without having to rename the documents or having to add comments to them.

The second method approach ignores the issue of exactly how many associated keywords should be considered in the selection of the results conveyed to the user and thus allows for various options including providing some suitable function of the selected results to the user rather than the results themselves.

Optionally, a new approach to ranking can also be incorporated. As described in more detail below, this is done by keeping an appropriate type of score against each associated keyword and using this score in an appropriate way to determine the rank of a resulting node/document.

The present invention can be used with a variety of electronic devices such as the pager (10), Personal Digital Assistant ("PDA" 30), conventional or IP telephone (20), cellular telephone (80), computer (with commonly associated peripherals and input devices, such as keyboard (40), microphone (50), video cam (70), or other input devices (60), as shown in FIG. 1. The minimum requirements for any such device are some means for accepting input from a user (as text or verbally), one or more processor(s) that execute stored program instructions to process the input, storage for the data and the program instructions and a display or other output device of some sort to make output visible or available to the user. Representative, non-exhaustive, example input devices can include, but are not limited to, a keyboard (40) or telephone keypad (90), as well as a handwriting or voice recognition system, a touch pad, a pointing device like a mouse, joystick, trackball or multi-directional pivoting switch or other analogous or related input devices (individually and collectively represented for simplicity in FIG. 1 as "Other Input" 60). The storage, whether contained in a computer, phone or other device mentioned above preferably includes non-volatile memory, and can also include volatile semiconductor-based memory, electromagnetic media, optical media or other types of rewriteable storage used with computer devices. If a display is used, the display may be small and capable of displaying only text and capable of displaying monochrome or color images in addition to text. If another output device is used, like a text to speech converter, appropriate implementing equipment will be included. Although described, for purposes of clarity, with reference to keyboard-type entry, it is to be understood that the present invention is independent of the particular mode of, or device used for, user input.

At the outset, it should be noted that, for the purposes of this description, a "document" as used herein is intended to be a very general term covering one or more characters, whether alone or in conjunction with numerals, pictures or other items. A document's length can vary from a single "word" to any number of words and it can contain many types of data other than words (e.g. numbers, images, sounds etc.). Thus, ordinary documents such as pages of text are documents, but so are spreadsheets, image files, sound files, emails, SMS text messages etc. Not only these, but also text in the form of, or that refers to, executable instructions/actions/transactions, executable by the device being used or by a remote device connected with the device being used, like a "menu" can also constitute a document in this sense. (This latter type of document becomes relevant when a user is looking for a relevant command to execute (e.g. changing a setting on a cellular phone or transferring a monetary amount from one account to another on a website or, more prosaically, deleting/moving/renaming/copying a file, sending an SMS message, calling up a contact etc.) by typing in a suitable query or selecting a specific option).

Often, when referring to a document, the node in the graph to which it is attached will also be referred to. This is because while, in some applications involving a more traditional kind of search, it is the documents themselves that are relevant, in other applications (e.g. an interactive voice response unit or "IVR"), it may be the node that is relevant, since getting to a relevant node may then trigger an entire sequence of further actions or transactions.

Finally, documents may or may not have "names". For example, a file on a computer hard disk will typically have a name whereas a prompt in an IVR typically does not have a name. These names, when they exist, may simply be considered to be part of the documents.

As noted above, a "word," for the purposes of this description, can be considered to be more than a string of alphabetic characters, it may include numeric and other symbols as well. Broadly, the invention also contemplates character strings that include any discrete collection of characters, symbols, or stroke based pictographs or ideograms, for example, those used in languages like Chinese, Korean and Japanese, and thus can benefit from use of the present invention. Thus, although for simplicity the term "word" is used in the following discussion, it should be understood to encompass any discrete collection of characters, symbols or other stroke based representations of communicative concepts, thoughts or ideas. Thus, the present techniques, although described with reference to English, are independent of any particular language. It can be used for phonetic, pictographic or ideographic languages when the characters, pictograms or ideograms used therein (or "stroke" components thereof) are considered "words" and thereby are intended to be encompassed by the terms "text" and "textual." Similarly, words also encompass (sound data) wave files corresponding to spoken words in any language. That is, when indexes are mentioned later, the association between two words or a word and a node or document could involve association with (sound data) wave files rather than actual text. Likewise, for simplicity in the following examples, the terms "typing" or "typed" are often used to describe data entry. However, those terms should be broadly read to encompass any and all methods of data entry, whether involving entry through use of a keyboard, a pointing or selection device, a stylus or other handwriting recognition system, as well as sound entries via a microphone, etc. They are not in any way intended to be limited only to methods that make use of a typewriter-like keyboard.

Examples of devices that can use and benefit from incorporation of the invention therein range from large computer networks, where an implementation of the invention may be part of or an application on the network, to small portable hand held devices of more limited or specialized function such as cell phones, text messaging devices and pagers. Implementations incorporating the invention can be used to assist users in interacting with large databases.

Figure 2:
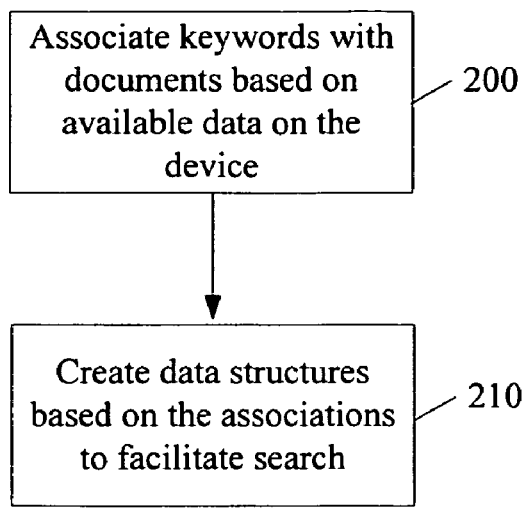
FIG. 2 illustrates in simplified form a flowchart relating to the generation of data structures in the system.

In further overview, as shown in the simplified flowchart of FIG. 2, given documents, organized by attachment to the nodes in a graph, new or unknown or learned words (and also, optionally, keywords and their synonyms already pre-existing in the system), are associated with keywords derived from the documents or associated directly with nodes in the graph (200). Data structures are then created based on these associations to facilitate future searches (210).

Figure 3:
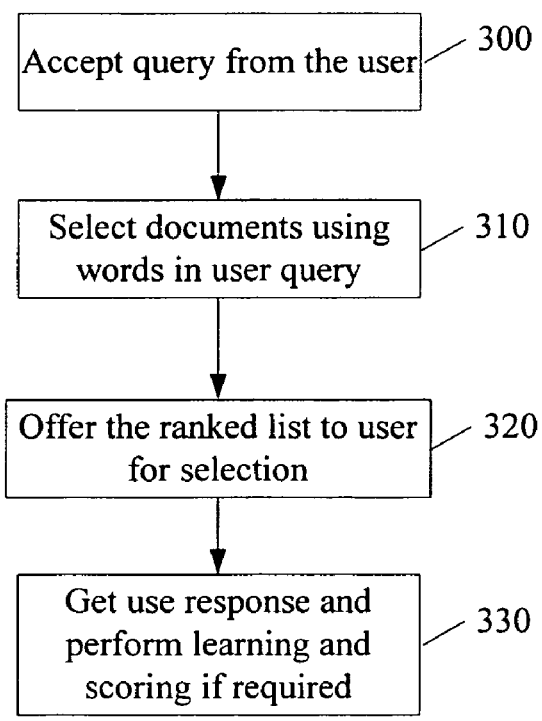
FIG. 3 illustrates in simplified form a flowchart relating to a process leading to the response of the system to a user query.

Moreover, upon a user inputting into or querying the system with such words, the associated keywords are used in multiple possible ways to determine the results (i.e. documents/nodes) returned to the user ranked in a way determined by a scoring system associated with the associated keywords. One non-limiting embodiment of this approach is depicted in the simplified flowchart of FIG. 3. The device accepts a query from the user (300) and selects documents using words from the query (310). A ranked list is then offered to the user (320) and, based on the response of the user, new associations can be learned (320).

The various approaches for doing the above are now described by way of example.

Assume that the documents in the collection (i.e. the entire set of documents under consideration) are organized in the form of a graph of nodes, with one or more documents attached to each node. (For simplicity, it will be assumed that there is just one document attached to each node; however, it is easy to extend the techniques when multiple documents are connected to a single node, although one can usually separately attach each document to a single node by adding more nodes to the graph.)

One way of thinking of a document that contains one or more words is as a bag or multiset of words. A bag or multiset is like an ordinary set in mathematics, a collection, except that it can contain multiple occurrences of the same element. For example, {book, cape, pencil, book} is a bag containing four words of which the word "book" appears twice. The order of occurrence of elements in a bag does not matter, and could equally be written as {book, book, pencil, cape}. Also, any bag can be converted to a set just by dropping multiple occurrences of the same element. Thus, the example bag above, when converted to a set, would be {book, cape, pencil}. To create the bag or multiset, the contents of a document with the exception of numbers which are a special case are stripped of all internal structure (e.g. syntactic structure, punctuation etc.) including all non-lexical items like images, sounds etc. (A special case is when wave files corresponding to useful information are retained so that the result offered to a user might be speech corresponding to the wave file derived from a speech synthesizer.) The resulting stripped document would be a bag or multiset of words as described above which may also include numbers and in which some words may occur multiple times. For a user who has a device with a number of stored documents or a service offering its stored databases for search or a menu tree offered by a company through its phone system, each pertinent document is similarly stripped down to form bags and the mathematical union of these bags can be taken to form a larger bag.

Figure 4:
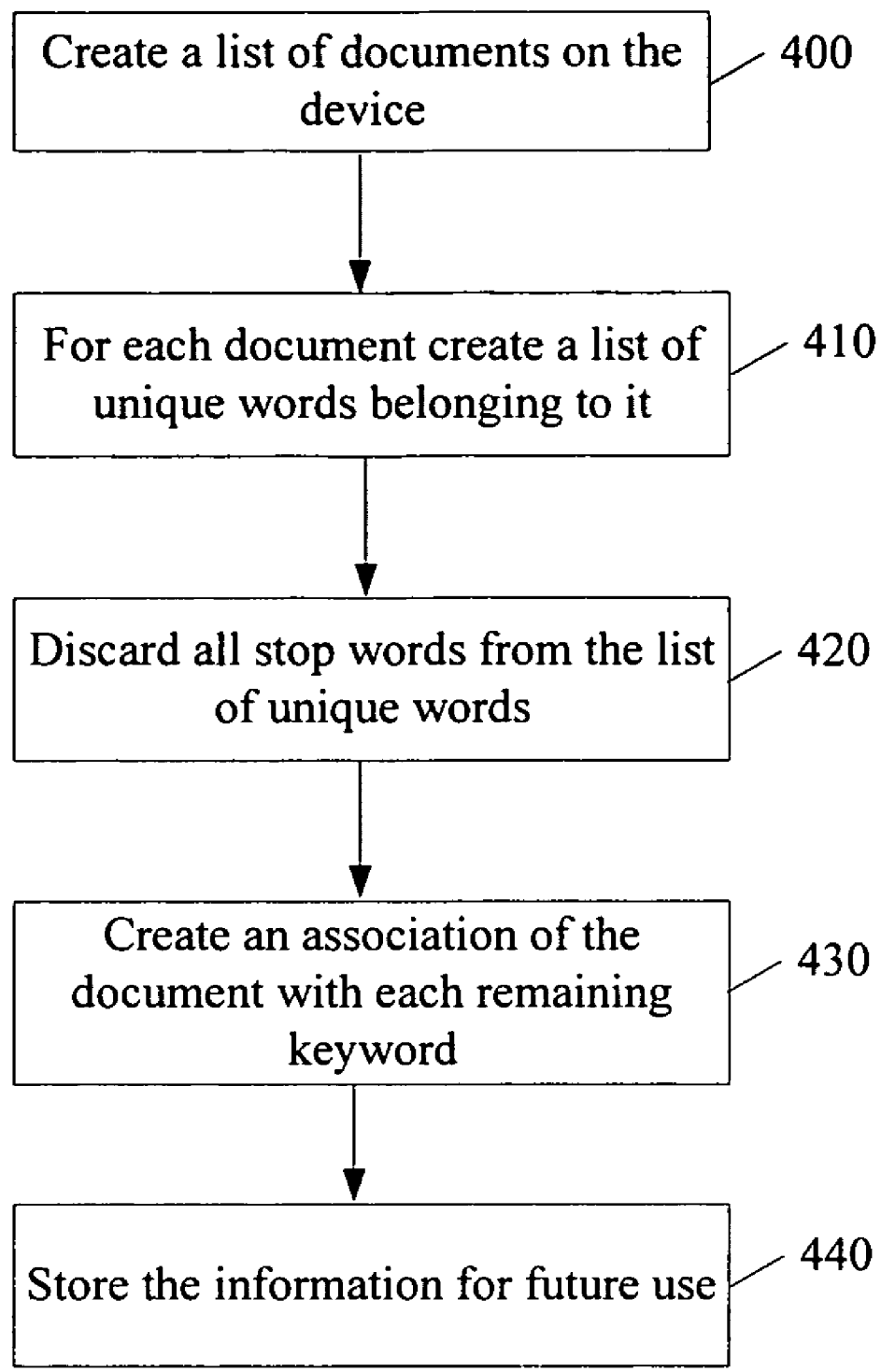
FIG. 4 illustrates in simplified form a flowchart of a process for the generation of data relating to the association of documents and keywords within the system.

As a side note, optionally, a certain class of words, typically called "stop words," are removed from such document-derived bags. Stop words are words like "the," "of," "in" etc. and are removable because they usually are not very informative about the content of the document. A non-limiting example flowchart for handling stop words is illustrated in FIG. 4. A list of documents on the device is prepared (400) and a list of unique words for each document created (410). Stop words are then removed from this list (420) and an association is made between each of the remaining keywords and the document (430). These associations can be stored for future use (440).

Stop words, if removed, can be removed from the bags either before or after a mathematical union of the bags is made, as the end result is the same. Typically stop words are identified in a list which can be used for the exclusion process. Since the stop word removal process is well known it is not described herein. In addition, in some implementations where a stop word list is used, the list may be editable so that additional words can be defined as "stop words." For example, otherwise non-trivial words that are trivial in the particular context because they occur too often in that context (e.g. words like "shares" in stock related government filings) may be added to the list of stop words either in an automated or manual way based on their high frequency.

By way of simplified example, if the user has just two documents to consider: "d1" made up of "an apple, apple cider and an orange" and "d2" made up of "a paper apple" then, each corresponding bag is {apple, cider, apple, orange} and {paper, apple}. Their union is the larger bag {apple, cider, apple, orange, paper, apple} and a set for the bag would be {apple, cider, orange, paper}.

Now consider a somewhat larger example as an illustration of how associations are formed and used in the invention.

Let there be five documents d1, d2, d3, d4, and d5 containing the following words (i.e. the sets rather than the bags are described):

d1: apple, cider, orange
d2: apple, paper
d3: apple, orange, table, chair
d4: table, chair, desk, furniture
d5: apple, strawberry, banana, raspberry Assume further that the graph in which these documents are organized is particularly simple, where there is a root node and five children nodes at the next level to each of which one of the documents above is attached. Assume also that an inverted index associating each word in each document (i.e. the keywords) with the documents that contain the word has been formed. This would look as follows: apple—d1, d2, d3, d5; cider—d1; orange—d1, d3; and so on for the rest of the words.

With ordinary navigation or search by keywords, this would work in the usual way, i.e. if a user types the word "desk", the system would look up the inverted index, find that "desk" is associated just with d4, and then return d4 to the user.

However, unlike conventional systems, systems implementing the techniques described herein provide the user, not d4 itself, but some function of d4 (e.g. a parent or a child).

Now assume a user inputs the new or unknown word "fruit" into the system. (Note that the word "fruit" can be considered new because it does not belong to any document.) According to one approach, the user is taken to the root node and offered the next level of the graph, namely, the five nodes/documents above. Assume the user picks d1. Then the system creates a new entry for "fruit" as follows: fruit—apple, cider, orange, associating all the keywords in d1 with "fruit.

This is where the first set of options arise.

One optional approach is as follows. When gathering keywords from the document selected by the user after tracing down the path in the graph, the system gathers all the keywords (i.e. all the words except for possible stop words) from the document (or optionally just some select ones based on one or more of various exclusion criteria). For example, if the system does not collect all the keywords, then with one exclusion approach, the system selects those keywords in the document based one or more criteria of "importance" (e.g. high frequency words, capitalized words, words appearing in any titles, or any of a number of such criteria singly or in combination). Here, for purposes of illustration, since the relevant files are small, all the keywords have been selected.

The next time the system receives user input with the same word "fruit" the system will look up the entry for "fruit", find the keywords associated with it (i.e. "apple", "cider", "orange", in this example), and return the documents that contain some or all of these keywords (or some function of these documents). Since "apple" is contained in d1, d2, d3, d5, "cider" is contained in just d1, and "orange" in d1 and d3, there is now a choice of how to select the documents to be returned from these listed documents.

At one extreme, only those documents are provided that lie in the intersection of the sets of documents associated with each associated keyword (in this example, it would be the intersection of {d1,d2,d3,d5}, {d1}, and {d1,d3}, namely {d1}); at the other extreme, the documents provided would be the union of the three sets (in this example, {d1,d2,d3,d5}). Intermediate options include, for example, providing the documents that contain at least two associated keywords—here, d1 and d3, since both contain "apple" and "orange"). Notably, with this approach to learning, while the user specified only d1 as his desired goal, the result of the next query was d1 and d3, thus making the learning process more complex and robust.

Figure 5:
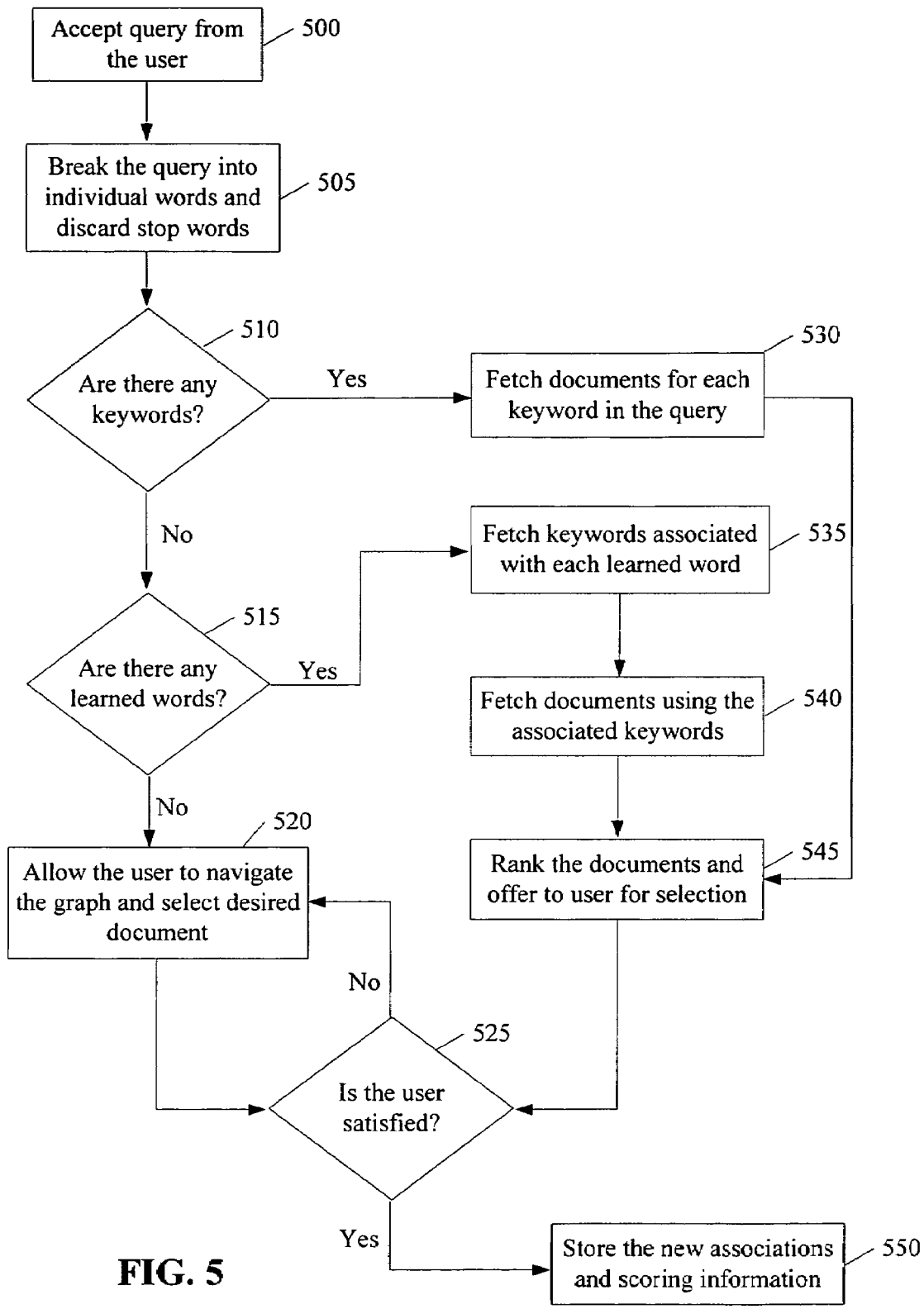
FIG. 5 illustrates in simplified form a flowchart for a learning process involving keywords.

A generalized scheme for this approach is illustrated in FIG. 5. The device accepts a query from the user (500), the query is divided into individual words and stop words are removed (505). The remaining individual words are examined to see if any keywords are present (510). If keywords are present, then the documents associated with each keyword are retrieved (530), and then ranked and offered to the user for selection (545). If the user is satisfied by one of the selections offered (525) then any new associations are stored in the system (550). If the user is not satisfied, then the user is allowed to navigate to the desired document (520), the user is deemed "satisfied" by the navigation and a new association is learned from that navigation and stored in the system for future use (550).

If there are no keywords identified in the users query, then the system will check for words where an association has been previously learned (a 'learned word', 515). If there are learned words, then the system retrieves the keywords associated with the learned word (535), retrieves the documents associated with these keywords (540) and presents them in a ranked list to the user (545). If the user is satisfied with the selections offered (525) then any new associations are stored in the system (550). If the user is not satisfied, then the user is allowed to navigate to the desired document (520), the user is deemed "satisfied" by the navigation and a new association is learned from that navigation and stored in the system for future use (550).

If the users query does not contain a keyword or a learned word, then the user is allowed to navigate to the desired document (520), the user is deemed "satisfied" by the navigation and an association between the selected document and the unknown word in the user query is learned from that navigation making the unknown word a learned word. This new association is stored by the system for future use (550).

It should be clear that each keyword associated with a new or learned word is associated with a set of documents that contain it, and that it is possible to return any subset of documents between the two extremes of intersection and union of these associated sets. In another example, if there had been a hundred keywords associated with a new word, then it would be possible in principle to return either only those documents corresponding to the intersection of all associated document sets (those that contain all hundred keywords) or the union of these associated document sets (those that contain at least one of the hundred keywords) or any sort of overlap in between, expressible by combinations of the union and intersection operations on the document sets (those that contain anywhere between 1 and 100 of the associated keywords, say at least 35 keywords, as one example).

One simple way of implementing this approach is to return those documents that contain some percentage ("p") of the associated keywords. Depending upon the implementation, this parameter "p" can be set in a variety of ways: it can be set by the user (where the user could alter it even for the same query to get different sets of results, either more or less restrictive), or it can be a function of one or more variables such as the document size, total number of associated keywords, or some combination thereof.

As noted above, incorporated herein by reference is a Computer Program Listing Appendix containing program code for an example implementation of some of the techniques described herein. That program code is written in C++ created for a cell phone application to run on a Symbian Operating System having a Series 60 Graphical User Interface.

In the software implementation of the Appendix, a combination is used: first there is a table that gives "p" as a result of document size and total number of keywords (with p increasing with document size and decreasing with an increase in total number of associated keywords), and the user is given the opportunity to alter this selection during the query phase. The threshold "p" is thus a way of controlling the relevance of the results to the formerly unknown word.

Another alternative approach is to compute the similarity between the learned word and the associated keywords and use only those keywords that are "closest" to the learned word. This can be carried out, for example, in the following way.

Assume given a learned word 'x' is associated with keywords k1, k2, k3 and k4 with scores of 2, 1, 3, 1 respectively. This indicates that 'x' was used and the user selected documents containing k1 twice, documents contain k2 once, documents containing k3 three times, and documents containing k1 once—that is, we can say the learned word 'x' "co-occurred" with k1—2 times, with k2—1 time, with k3—3 times and k4—1 time. We also have co-occurrence within a document of the keywords k1, k2, k3, and k4 with each other. This co-occurrence may be measured in any of the standard ways for determining co-occurrence of words, say within a paragraph or other similar unit within each document, and then added up across all of the documents in the collection.

Next, a matrix is formed having keywords as columns and the learned word and keywords in rows (or vice-versa). Each cell of the matrix will then be used to contain the total co-occurrences of the word representing the row and the column.

By way of example, the matrix formed will be similar to the hypothetical matrix show below:

TABLE 1

|    | K1 | K2 | K3 | K4 |
|----|----|----|----|----|
| X  | 2  | 1  | 3  | 1  |
| K1 | 3  | 1  | 4  | 2  |
| K2 | 1  | 2  | 2  | 3  |
| K3 | 4  | 2  | 6  | 2  |
| K4 | 2  | 3  | 2  | 4  |

Here the row representing 'x' describes the associations of word 'x' with the keywords represented in each column, and the rows representing the keywords k1 to k4 describe their associations with other keywords (in each column) including themselves. If the pattern of associations of 'x' with the keywords matches that of any of the keywords (say k3) with all the keywords, it would indicate that 'x' and that keyword (k3) have similar associations. Therefore, documents containing those keywords are more likely to be preferred by the user when the user types 'x'. To find the similarity of patterns we can treat each row as a vector and calculate the cosine of the angle formed by the vector corresponding to the learned word with the vector corresponding to each keyword using the standard formula for cosines.

After normalization of the vectors in the above matrix we have

TABLE 2

|    | K1    | K2    | K3    | K4    |
|----|-------|-------|-------|-------|
| X  | 0.516 | 0.258 | 0.775 | 0.258 |
| K1 | 0.548 | 0.183 | 0.730 | 0.365 |
| K2 | 0.236 | 0.471 | 0.471 | 0.707 |
| K3 | 0.516 | 0.258 | 0.775 | 0.258 |
| K4 | 0.348 | 0.522 | 0.348 | 0.696 |

The keywords whose cosine values with the learned word are nearest to 1 will be most similar to the learned word. In the above example, if we calculate the cosine values of x with other keywords we get the following results.

(x, k1)=0.989; (x, k2)=0.791; (x, k3)=1; (x, k4)=0.764

The application then can choose the closest few keywords (keywords k3 and k1 in the above example) based on some threshold to derive the result, that is, the documents containing those closest keywords and return either those documents themselves or suitable functions of them to the user. In practice, the threshold may be quite low numerically, though adjusting the threshold allows one to control the relevance of the results.

This method is expected to prove more accurate as the number of associated keywords grows, which is when the method is most required in any case, since a larger number of associated keywords indicates a larger number of resulting documents and this needs to be controlled.

It is also possible, as has been implemented in the appended software, to first offer the intersection of all the associated document sets (since this may represent maximal relevance), and if this is empty then to use either of the methods above.

Also, it is possible to optionally eliminate high frequency associated keywords (i.e. keywords that occur in a large number of documents) prior to the step of using the threshold "p" percent. (For example, the word "apple" occurs in four out of five documents above and so may be judged to be of high frequency—this would mean that, optionally, the word "apple" would be ignored in the processing.)

It has been emphasized throughout that, depending on the application at hand, it may be advantageous to return not the documents selected themselves but possibly some suitable function of them (typically, parents, children, ancestors, siblings etc. in relation to the tree or graph). Also, note that the system above has been described with respect to associations formed between the unknown word and keywords contained in the selected document.

Figure 6:
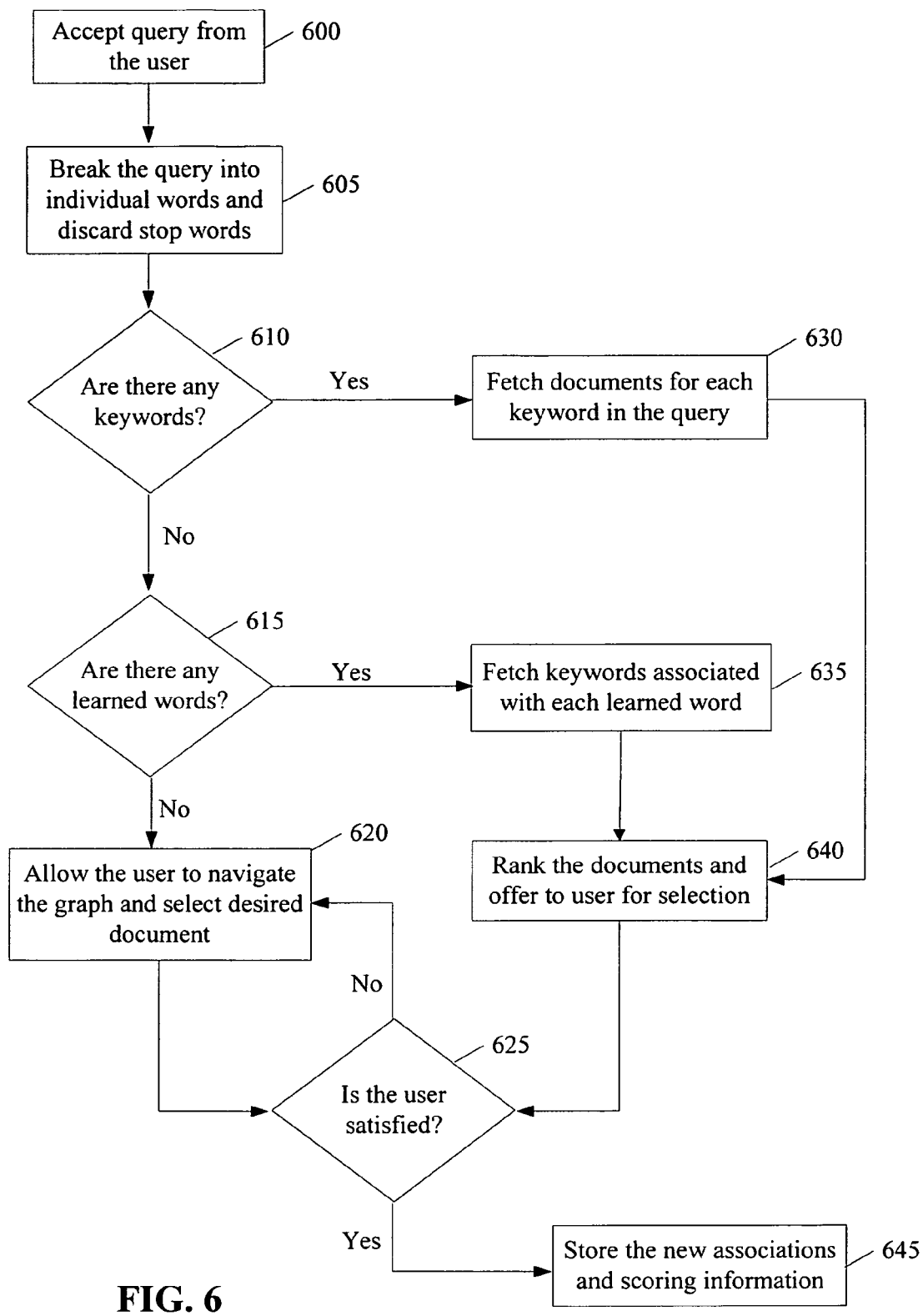
FIG. 6 illustrates in simplified form a flowchart for a learning process involving documents.

Instead of this, it is possible to create associations between the unknown word and the documents selected by the user themselves. This approach is illustrated in general form in FIG. 6. First, a query is accepted from the user (600), stop words are removed (605) and the remaining words are examined to see if there are any keywords (610). If there are keywords, then the documents associated with the keywords are retrieved (630) and presented to the user for selection in a ranked list (640). If the user is satisfied by the selection, then any associations are stored for future use (645). If the user is not satisfied, then the user is allowed to navigate to the desired document (620), the user is deemed "satisfied" by the navigation and a new association is learned between the keyword and the selected document and stored for future use (645).

If there are no keywords in the user query, then the system will check if there are any learned words (615). If there are learned words, then the system retrieves the documents associated with each learned word (635) and offers a ranked list of the documents to the user for selection (640). If the user is satisfied by the selection, then any new associations are store for future use (645). If the user is not satisfied, then the user is allowed to navigate to the desired document (620), the user is deemed "satisfied" by the navigation and a new association is learned and stored for future use (645).

If the user query does not contain a keyword or a learned word, then the user is allowed to navigate to the desired document (620), the user is deemed "satisfied" by the navigation and a new association between the unknown word and the selected document is learned and stored for future use (645).

In some applications, it can also be useful to keep both sets of associations, with keywords and with documents, and use them in deriving results. In addition, this learning approach can be used not just for new or unknown words, but also for existing synonyms (e.g. those from a manually or automatically generated thesaurus) to improve the meanings associated with the synonyms as well as against the keywords themselves.

Figure 7:
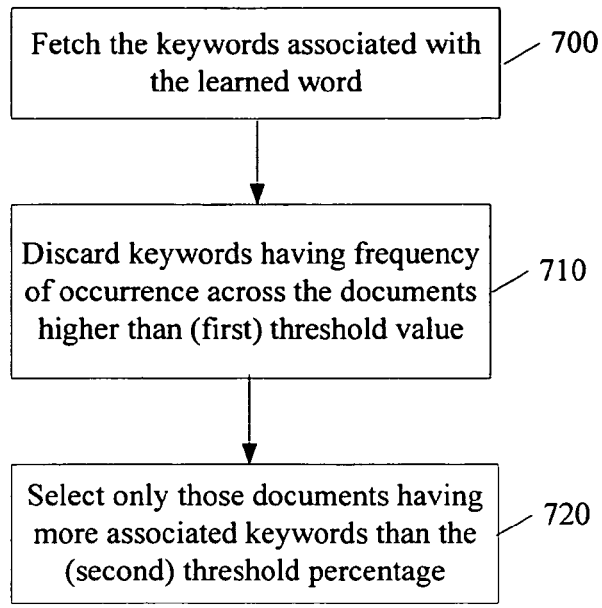
FIG. 7 illustrates in simplified form a flowchart for the selection of documents using a learned word.
Figure 8:
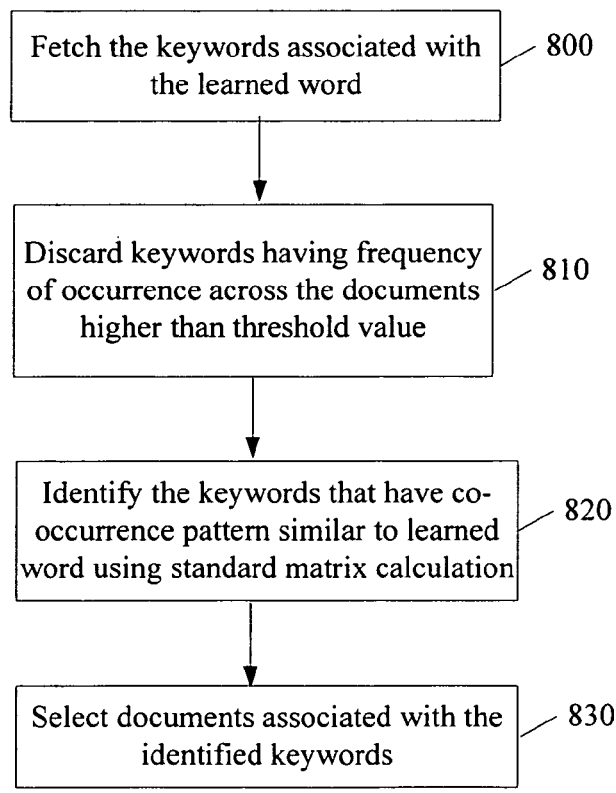
FIG. 8 illustrates in simplified form a flowchart of an alternate process for selecting documents using a learned word.

FIG. 7 illustrates, in simplified form, a flowchart relating to the selection of a document using a learned word as described above. Keywords associated with a learned word are retrieved (700) and those with a frequency of occurrence across documents on the device that is higher than a first threshold value are discarded (710). Documents with more associated keywords than a second threshold percentage are then selected for presentation to the user (720). An alternative approach is illustrated in the flowchart of FIG. 8. Keywords are retrieved (800) and those keywords having a frequency of occurrence across documents on the device that is higher than a threshold value are discarded (810). Then keywords are identified which have a co-occurrence pattern similar to a learned word using standard matrix calculations (820). Documents associated with the identified keywords are then selected for presentation to the user (830).

Note further that it is not necessary for the user to trace down all the way to the leaf or terminal nodes of the tree or graph—in some cases any intermediate node may be a "goal" and thus the approach works for intermediate nodes as well.

In some applications, or in some parts of some applications, it is possible that the user may not wish to find some information but rather to execute a command—like making an airline reservation or copying a file or sending an SMS message. The above techniques are applied, in such a case, in exactly the same way; with the relevant dialogue(s) or instruction(s) attached to a node in the graph constituting the document.

In some implementations one need not restrict a search just to keywords in a document. In such cases, the system can use the same approaches to also access metadata of all kinds. This also includes the date of creation or modification of a file, the author of the file, the type of the file, the name of the sender of an email or SMS message etc. Essentially any special structure that a file type might have could be exploited by the search, especially to narrow or refine a search if too many results are returned on the first attempt.

In some implementations, virtual folders are used to save the results of searches (e.g. all files modified on a particular date can be gathered together). This method can be dynamically applied so that the system can keep learning new meanings against the relevant word (usually a formerly unknown word). Each time a set of results is offered to the user, the user can accept or reject the results; if accepted, the learning remains the same, if rejected, the user is allowed to trace down another path and select a document to his taste; this new document's keywords will now be added to the meanings of the unknown word, and the process will work as before from then on. The parameter "p" can similarly be adjusted dynamically based upon acceptance/rejection.

Just as new meanings can be added, associations with keywords can also be dropped if their frequency goes below another threshold. This allows the set of associations of an unknown word (or other type of word) to increase and decrease with time. There are many ways of implementing this. Examples include keeping track of which documents from the proffered results are actually accessed by the user; if a document is never accessed over some period of time, or number of queries, or accessed only infrequently, then the keywords uniquely associated with that document can be dropped from the associated meanings of the unknown word. The unlearning offers the possibility of dropping undesirable meanings from the learned words.

It should be easy to see that this system of learning enables one to get at a "concept" that underlies a word rather than rely only on the form of the word, which is the essential limitation of the keyword based approaches to navigation and search. It has many applications: it can significantly expand the vocabulary and hence comprehension powers of a system, especially when trained by multiple users, but it can also help in training a system to recognize common spelling errors, useful shortcuts and abbreviations, and even speech patterns (in the form of wave files) and other such non-lexical items by treating these forms as unknown "words" and associating them with keywords in the manner described above.

Having described the approach for selecting results, the optional ranking aspect of the approach is now described. Essentially a scoring system is used to get at some ranking of results. This scoring system can be based on objective criteria pertaining to the selected documents themselves or on subjective criteria based on the users' preferences. Objective criteria can be various ways of determining the importance of a document from amongst the set of selected documents based on factors like the occurrence of various associated keywords in the title, in capitals etc.

An example of subjective, user-based criteria is as follows. A score is maintained against each associated keyword depending on how many times a document containing that keyword has been actually accessed by the user. Then when some set of results is selected by the system based on the family of techniques described above, this set can be ranked by some function of these scores. For example, the rank of a document can be based on the sum of the scores of each associated keyword in that document divided by the total number of associated keywords considered. An instance of this is as follows: if the unknown word is associated with five keywords and if the first two have a score of 2 and the latter three a score of 1, and if a document in the set of results contained the first and third keywords, then its overall score would be (2+1)/2=1.5. Similarly, all the documents in the set of results would receive a score and thus by implication a rank. Other scoring schemes are possible of course; one advantage of this scheme is that it indirectly normalizes for the length of a document (otherwise longer documents would tend to get higher ranks).

Figure 9:
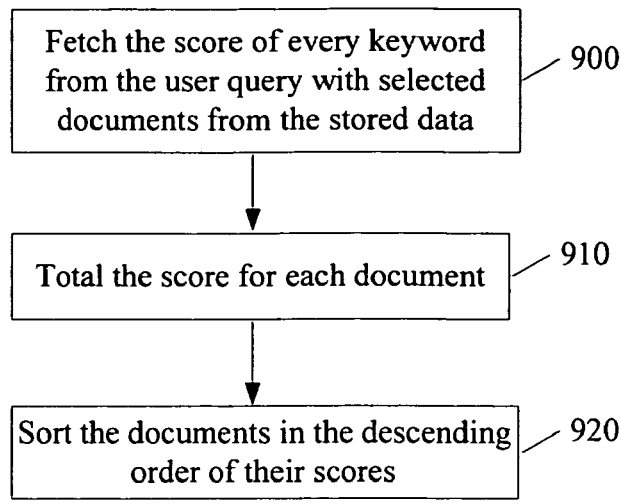
FIG. 9 illustrates in simplified form a flowchart of a process for the ranking of documents using keyword scores.

One non-limiting example of a scoring scheme is illustrated in the flowchart of FIG. 9. After obtaining a keyword from a user query, the score of each keyword is retrieved from data stored on the device along with the documents associated with the keyword (900). The total score from all of the keywords associated with each document is then obtained (910) and then the documents are sorted according to their total score (920).

Figure 10:
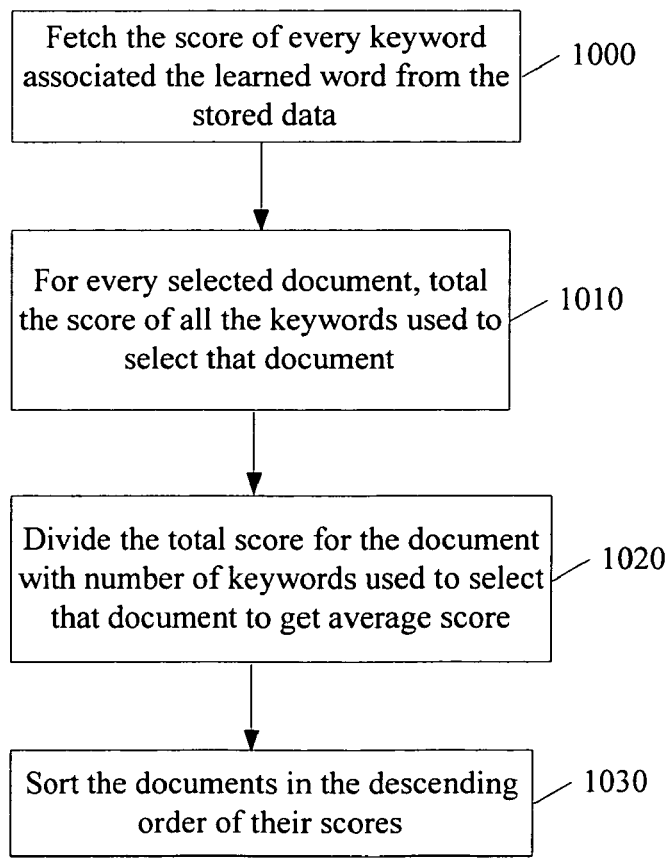
FIG. 10 illustrates in simplified form a flowchart of a process for the ranking of documents using learned word scores.

An alternative approach for using scoring in conjunction with learned words is illustrated in FIG. 10. The score of each keyword associated with the learned word is retrieved for data stored on the device (1000). For each document that has been selected, the total score from all of the associated keywords is determined (1010). The total score for each document is then divided by the total number of keywords associated with that document to obtain the average score (1020). The documents are then sorted in order of their scores (1030).

The objective and subjective ranking methods can be combined if desired. Also, as implemented in the appended software, the results can first be split into two groups, one of actually accessed documents some time in the past and the other of possibly relevant documents that may never have been accessed; then the first and second subsets are internally ranked by the scoring system described above and the first subset is displayed first and the second subset second, according to the ranking of each subset. This helps to ensure that accessed documents are always displayed first before non-accessed documents, since these have already been found relevant by the users of the system in the past.

Both the system of selecting results and the system of ranking are dynamic and are optional components of the learning system described herein.

In the above example, we considered only a simple static collection of documents. It is also possible to apply this technology to a collection whose contents may change with time. For example, a typical file-system, where documents are frequently added, deleted or modified could also be considered. In such a scenario, the existing index or information set can be updated by adding or deleting the keywords associated with the concerned document and adding or dropping the association of that document with those keywords. It is possible that when a new document is added, it contains a keyword that was previously learned by the system; in such a case, the system can use both its direct association with documents as well as its association with other keywords (derived through the learning process) to obtain the set of resulting documents.

It should be noted that, depending upon the implementation, the information set created by this approach might be stored on local storage media (i.e. on the device) or on storage that is part of some accessible network. Similarly, it could be stored using any format or method, including but not limited to a relational database, XML etc.

The program contained in the Computer Program Listing Appendix (that is incorporated herein by reference as if fully set forth herein) illustrates in implementation form details of some of the various aspects described above. Moreover, at least some of the flowcharts correspond to processing performed by the program contained in the Computer Program Listing Appendix.

Finally, it is to be understood that various variants of the invention including representative embodiments have been presented to assist in understanding the invention. It should be understood that they are not to be considered limitations on the invention as defined by the claims, or limitations on equivalents to the claims. For instance, some of these variants are mutually contradictory, in that they cannot be simultaneously present in a single embodiment. Similarly, some advantages are applicable to one aspect of the invention, and inapplicable to others. Thus, no particular features or advantages should be considered dispositive in determining equivalence.

It should therefore be understood that the above description is only representative of illustrative embodiments. For the convenience of the reader, the above description has focused on a representative sample of all possible embodiments, a sample that teaches the principles of the invention. The description has not attempted to exhaustively enumerate all possible combinations or variations, for example, those arising out of the use of particular hardware or software, or the vast number of different types of applications in which the invention can be used. That alternate embodiments may not have been presented for a specific portion of the invention, or that further undescribed alternate embodiments may be available for a portion of the invention, is not to be considered a disclaimer of those alternate embodiments. One of ordinary skill will appreciate that many of those undescribed embodiments incorporate the minimum essential aspects of the invention and others incorporate one or more equivalent aspects.

What is claimed is:

1. A method performed in a system comprising user navigable nodes, documents attached to the user navigable nodes, keywords associated with the user navigable nodes and having search and navigation capability that allows users to move from node to node via links between the nodes and make selections when at individual nodes, the method comprising, at a user navigable node within the system:
   receiving an input from a user;
   determining that the input contains an unknown word;
   subsequent to the determining, navigating through the system to a current node from the user navigable node based upon at least one additional input from the user that was provided while at the user navigable node;
   presenting at least one response to the user based upon the documents attached to the current node resulting from the navigation; and
   following presentation of the at least one response, learning one or more associations between the unknown word and one or more keywords from the documents attached to the current node, such that a direct relationship is formed between the unknown word and the one or more keywords.

2. The method of claim 1, further comprising:
   receiving a new user input; and
   using a result of the learning to identify a group of documents to be potentially provided as an output.

3. The method of claim 2, further comprising:
   selecting a subset of the group of documents that will be used in providing the output.

4. The method of claim 3, further comprising:
   ranking the subset prior to the providing.

5. The method of claim 4, wherein the ranking comprises:
   applying at least one objective criterion.

6. The method of claim 4, wherein the ranking comprises:
   applying at least one subjective criterion.

7. The method of claim 6, wherein the applying at least one subjective criterion comprises:
   determining a score for each document in the subset.

8. The method of claim 2, wherein the selecting the subset comprises:
   eliminating at least some of the documents in the group based upon a threshold "p".

9. The method of claim 2, wherein the selecting the subset comprises:
   eliminating at least some of the documents in the group based upon a result of computing a similarity between the unknown word and one or more associated keywords.

10. The method of claim 1, further comprising:
    computing a similarity between the unknown word and one or more associated keywords.

11. A method performed in a system comprising user navigable nodes and having search and navigation capability that allows users to move among nodes in the system via links between the nodes, the method comprising, at a node within the system:
    receiving an input from a user;
    determining that the input contains an unknown word;
    navigating within the system by the user traversing from the node to a current node;
    presenting at least one response to the user based upon documents attached to the current node resulting from the navigation; and
    following presentation of the at least one response, learning, from the current node, one or more node or document associations for the unknown word based upon at least one additional input from the user, such that a direct relationship is formed between the unknown word and at least one other keyword.

12. The method of claim 11, further comprising:
    receiving a new user input; and
    using a result of the learning to identify a group of documents containing keywords to be potentially provided as an output.

13. The method of claim 12, further comprising:
    selecting a subset of the group of documents that will be used in providing the output.

14. The method of claim 11, further comprising:
    ranking the subset prior to the providing.

15. The method of claim 13, wherein the ranking comprises:
    applying at least one objective criterion.

16. The method of claim 13, wherein the ranking comprises:
    applying at least one subjective criterion.

17. The method of claim 16, wherein the applying at least one subjective criterion comprises:
    determining a score for each document in the subset.

18. The method of claim 12, wherein the selecting the subset comprises:
eliminating at least some of the documents in the group based upon a threshold "p".

19. A computer program product comprising:
a computer readable storage medium having program instructions thereon including
  i) first program instructions to receive an input from a user;
  ii) second program instructions to determine that the input contains an unknown word;
  iii) third program instructions that will effect a navigation of the user, in a system comprising user navigable nodes, from a node to a current node via a link connecting the node to the current node, following execution of the second program instructions;
  iv) fourth program instructions to present at least one response to the user based upon documents attached to the current node while the user is at the current node and resulting from the navigation by the user; and
  v) fifth program instructions to learn one or more associations for the unknown word from one of the current node or a document associated with the current node such that a direct relationship is formed between the unknown word and a keyword already associated with one of the current node or a document associated with the current node, following presentation of the at least one response, based upon at least one additional input from the user, wherein the one or more associations comprise at least one of
    a) a node association, or
    b) a document association
wherein the first, second, third and fourth program instructions are stored on the computer readable medium.

20. The system of claim 19 wherein the first, second, third and fourth program instructions are stored within one of: a cell phone, a text messaging device, a pager, a personal digital assistant, an interactive voice recognition system, or a computer.

* * * * *